United States Patent [19]
Tannhauser

[11] 3,818,135
[45] June 18, 1974

[54] CIRCUITRY FOR TRANSMISSION OF PHASE DIFFERENCE MODULATED DATA SIGNALS

[76] Inventor: Armin Tannhauser, Gerokstrasse 8, 8 Munich 25, Germany

[22] Filed: Sept. 24, 1971

[21] Appl. No.: 183,588

[52] U.S. Cl. .................................. 178/67, 332/16 R
[51] Int. Cl. .................................. H04l 27/20
[58] Field of Search ...... 179/67, 66 A; 325/45, 163, 325/145, 30; 332/16, 16 T; 331/179; 328/155; 307/262

[56] References Cited

UNITED STATES PATENTS 3,430,143 2/1969 Walker .................................. 178/67

*Primary Examiner*—Robert L. Griffin
*Assistant Examiner*—A. M. Psitos
*Attorney, Agent, or Firm*—Schuyler, Birch, Swindler, McKie and Beckett

[57] ABSTRACT

A circuit is described for transmitting phase difference modulated data signals, i.e., where the information being transmitted is contained in phase shifts of the transmitted carrier. A transmission oscillator emits a rectangular periodic signal having a frequency equal to n times the carrier frequency, where $n$ equals the number of different phase values or data levels to be transmitted. The oscillator output frequency is reduced to the carrier frequency by means of binary divider stages. The binary data to be transmitted are coupled to a coder which combines the various data levels falling within a given modulation segment and determines the phase shift to be transmitted according to the code being used. The coder has a separate output line for each phase shift value, and each such output is connected to an input of the one of the divider stages which effects the phase shift corresponding to that output. Upon the initiation of a new modulation segment, a short pulse is emitted on one of the coder output lines, and this pulse causes a 360° phase shift in the rectangular oscillator output. Each subsequent divider stage divides this phase shift in half to realize the desired phase shift for the data level combination being transmitted.

5 Claims, 11 Drawing Figures

Fig. 2a

| φt | a1' | a2' | a3' | a4' | a1 | a2 | a3 | a4 |
|---|---|---|---|---|---|---|---|---|
| 0° | 0 | 0 | 0 | 0 | 0 | 0 | 0 | 0 |
| +22,5° | 0 | 0 | 0 | 1 | 0 | 0 | 0 | 1 |
| +45° | 0 | 0 | 1 | 0 | 0 | 0 | 1 | 1 |
| +67,5° | 0 | 0 | 1 | 1 | 0 | 0 | 1 | 0 |
| +90° | 0 | 1 | 0 | 0 | 0 | 1 | 1 | 0 |
| +112,5° | 0 | 1 | 0 | 1 | 0 | 1 | 1 | 1 |
| +135° | 0 | 1 | 1 | 0 | 0 | 1 | 0 | 1 |
| +157,5° | 0 | 1 | 1 | 1 | 0 | 1 | 0 | 0 |
| 180° | 1 | 0 | 0 | 0 | 1 | 1 | 0 | 0 |
| −157,5° | 1 | 0 | 0 | 1 | 1 | 1 | 0 | 1 |
| −135° | 1 | 0 | 1 | 0 | 1 | 1 | 1 | 1 |
| −112,5° | 1 | 0 | 1 | 1 | 1 | 1 | 1 | 0 |
| −90° | 1 | 1 | 0 | 0 | 1 | 0 | 1 | 0 |
| −67,5° | 1 | 1 | 0 | 1 | 1 | 0 | 1 | 1 |
| −45° | 1 | 1 | 1 | 0 | 1 | 0 | 0 | 1 |
| −22,5° | 1 | 1 | 1 | 1 | 1 | 0 | 0 | 0 |

Fig. 2b

| φt | a1' | a2' | a3' | a1 | a2 | a3 |
|---|---|---|---|---|---|---|
| 0° | 0 | 0 | 0 | 0 | 0 | 0 |
| +45° | 0 | 0 | 1 | 0 | 0 | 1 |
| +90° | 0 | 1 | 0 | 0 | 1 | 1 |
| +135° | 0 | 1 | 1 | 0 | 1 | 0 |
| 180° | 1 | 0 | 0 | 1 | 1 | 0 |
| −135° | 1 | 0 | 1 | 1 | 1 | 1 |
| −90° | 1 | 1 | 0 | 1 | 0 | 1 |
| −45° | 1 | 1 | 1 | 1 | 0 | 0 |

Fig. 2c

| φt | a1' | a2' | a1 | a2 |
|---|---|---|---|---|
| 0° | 0 | 0 | 0 | 0 |
| +90° | 0 | 1 | 0 | 1 |
| 180° | 1 | 0 | 1 | 1 |
| −90° | 1 | 1 | 1 | 0 |

| $\varphi_t$ | a1' | a2' | a3' | a1 | a2 | a3 |
|---|---|---|---|---|---|---|
| 0° | 0 | 0 | 0 | 0 | 1 | 1 |
| +45° | 0 | 0 | 1 | 0 | 1 | 0 |
| +90° | 0 | 1 | 0 | 1 | 1 | 0 |
| +135° | 0 | 1 | 1 | 1 | 1 | 1 |
| 180° | 1 | 0 | 0 | 1 | 0 | 1 |
| −135° | 1 | 0 | 1 | 1 | 0 | 0 |
| −90° | 1 | 1 | 0 | 0 | 0 | 0 |
| −45° | 1 | 1 | 1 | 0 | 0 | 1 |

| $\varphi_e'$ | V1 | | V2 | | $\varphi_t'$ | a1' | a2' |
|---|---|---|---|---|---|---|---|
| | a1 | a2 | a1 | a2 | | | |
| 0° | 0 | 0 | 0 | 1 | 180° | 1 | 0 |
| +90° | 0 | 1 | 1 | 1 | +90° | 0 | 1 |
| 180° | 1 | 1 | 1 | 0 | 0° | 0 | 0 |
| −90° | 1 | 0 | 0 | 0 | −90° | 1 | 1 |

| $\varphi_e'$ | a1 | a2 | $\varphi_t$ | a1' | a2' | a3' |
|---|---|---|---|---|---|---|
| 45° | 0 | 0 | 135° | 0 | 1 | 1 |
| 135° | 0 | 1 | 45° | 0 | 0 | 1 |
| -135° | 1 | 1 | -45° | 1 | 1 | 1 |
| -45° | 1 | 0 | -135° | 1 | 0 | 1 |

CIRCUITRY FOR TRANSMISSION OF PHASE DIFFERENCE MODULATED DATA SIGNALS

BACKGROUND OF THE INVENTION

The invention relates to circuitry for transmission of phase difference modulated data signals in which data in binary coded form are transmitted through specific, different phase shifts. The phase shifts follow each other in the fixed time interval of a modulation segment and are associated with the step combinations or voltage levels of the data to be transmitted falling in a modulation segment.

Phase difference modulation is a known technique for the transmission of binary coded data. In phase difference modulation the data to be transmitted are designated, not by the phase position of the carrier frequency oscillation, but by the change of the phase position. For example, in binary modulation, the "zeros" are denoted by a phase change, whereas the "ones" are denoted by no phase change (or vice versa). With four-valued modulation, two binary steps are expressed respectively through a modulation process, and for example a phase jump of +90° denotes the step pair (dibit) "01," a phase jump of −90° denotes the step pair "10," and phase jump of 180° denotes the step pair (dibit) "11," and no phase change denotes the step pair (dibit) "00."

Demodulation at the receiver proceeds with aid of a signal generator, which generates a frequency which corresponds to the unmodulated carrier oscillation and is synchronized to the received carrier frequency. The phase shift is determined from a comparison of the received and local signals, and the correspondingly fixed step combination is transmitted as received data.

A carrier frequency generator is provided in a known transmission circuit for a three-valued (ternary) phase difference modulation which provides the carrier oscillations in three different phase positions, preferably displaced by 120° with respect to each other. A control and evaluation circuit, which is controlled by periodic pulses which arise in the middle of the step, releases a through-switching mechanism for the established phase value. Such a circuit is described in West German Pat. No. 1,165,657.

With a higher valued, for example an eight-valued phase difference modulation, a larger outlay would be necessary for the provision of the 8 different phase positions of the carrier frequency, as well as for the evaluation and control circuit, which combines eight different step combinations into three steps, evaluates them and determines the phase shift. A coordination with other phase difference transmission systems, which transmit a smaller or a larger number of phase values, is not feasible, because of the numerous and complex modifications which would be required.

The medium of transmission of information in phase difference modulation is either the phase difference $\tau_t$ at the juncture of two modulation segments or the phase difference $\tau_e$ between corresponding moments, for example the beginnings or the centers of the $n$th and of the $(n+1)$th modulation segment. The modulation of the carrier frequency with $\tau_e$ requires basically a static storing of the characteristic phase $\phi_n$ of the preceeding nth modulation segment. The characteristic phase to be set anew $\phi\ n+1$ results from the definition of the $\tau_e : \tau_e = \phi\ n+1 - \phi_n$. In the same manner, in demodulation to determine $\tau_e$ the knowledge of the beginning phase of the present modulation segment and of the beginning phase of the preceeding modulation segment is necessary as reference phase. Static stores for $\phi_n$ and at least temporarily for $\phi_{n+1}$ are necessary.

Demodulators which measure directly the difference between two phases were known only for $\tau_e$. Yet, a demodulator has already been proposed which enables the evaluation of $\tau_t$.

It is an object of the invention to provide a transmission circuit in which the transmitted binary data are represented by $\tau_t$.

SUMMARY OF THE INVENTION

The foregoing and other objects are achieved by providing a transmission oscillator which emits a rectangular frequency having n times the value of the carrier frequency to be transmitted, given $n$-valued phase difference modulation. A frequency divider is connected to the transmission oscillator output and divides the oscillator frequency down to the carrier frequency using binary divider stages. Binary data are coupled to a coder, which combines the data levels falling in a modulation segment and establishes the phase shift to be transmitted in accordance with the coding. The coder has a separate output line for each phase shift value, which is connected to the control input of the divider stage effecting the established phase shift. At the moment when a new modulation segment starts, a short pulse is emitted on one of the output lines which effects a 360° phase shift in the rectangular oscillation, and each succeeding divider stage divides the phase shift into half the value.

The transmission circuit has an especially simple, inexpensive modulator. In connection therewith the method of operation of the coder is also especially simple. A compatibility with systems which use the $\tau_e$ as carrier of information can be easily produced. The transmission circuit operates together with other phase difference transmission systems using other phase values through slight changes.

BRIEF DESCRIPTION OF THE DRAWINGS

The principles of the invention will be best understood by reference to the description given below of preferred embodiments constructed according to these principles and the drawings in which:

FIG. 2*a* is a chart showing relationships in the FIG. 1 modulator and in the coder for 16 phase shift values.

FIG. 2*b* is a chart showing the relationships in the FIG. 1 modulator and in the coder for eight phase shift values;

FIG. 2*c* shows the relationships in the moduator and in the coder for four phase shift values;

DETAILED DESCRIPTION OF THE DRAWINGS

Figure 1:
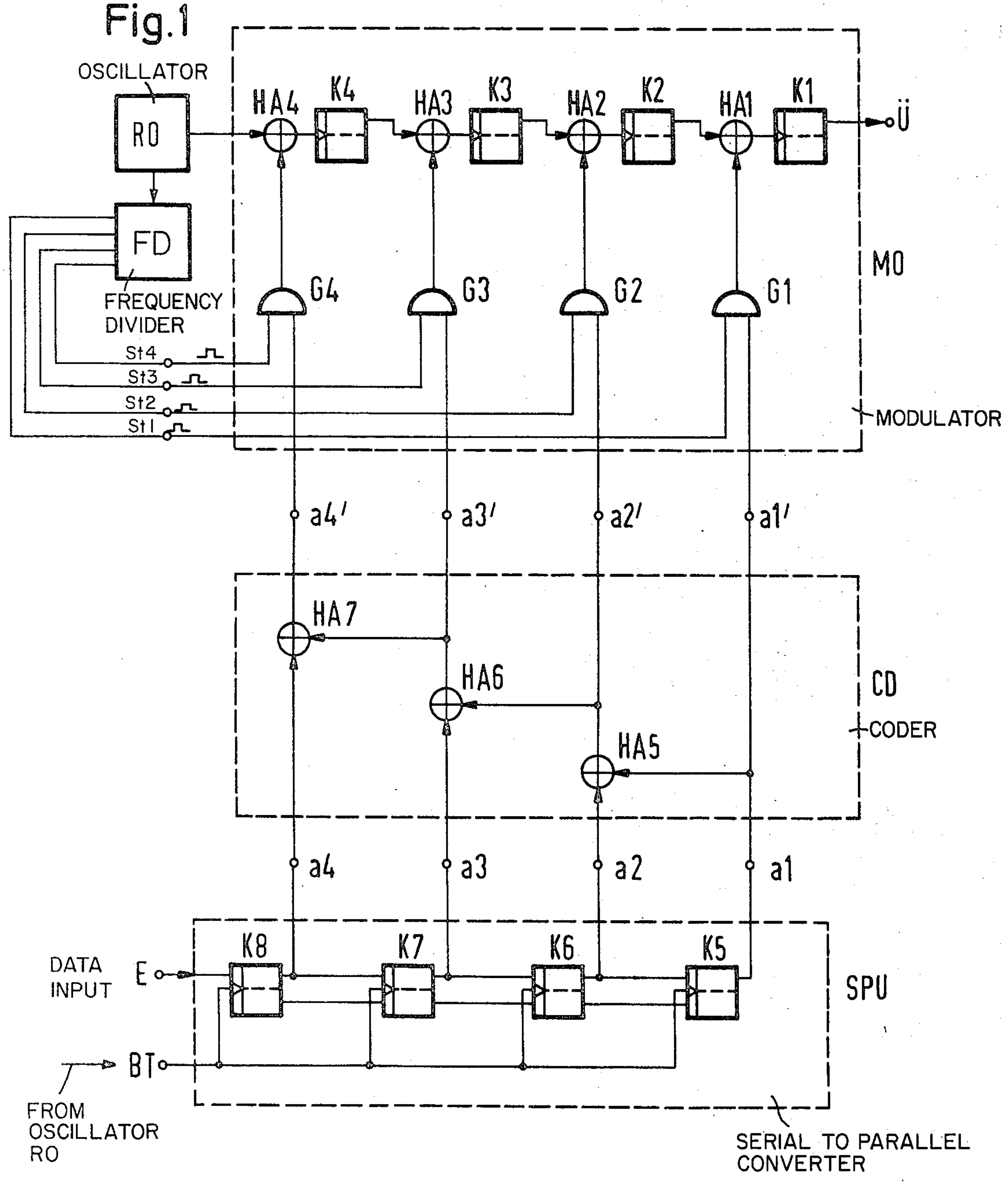
FIG. 1 is a schematic diagram of a transmission circuit for 16-valued phase difference modulation.

FIG. 1 shows a preferred embodiment of a transmission circuit for a 16-valued phase difference modulation system. The transmitter contains an oscillator RO, of known construction, which generates *n* times the carrier frequency, given *n*-valued difference modulation, i.e., in the example at hand 16 times the carrier frequency. The transmission oscillator RO clips the emitted signal so that a rectangular output signal arises. There are a wide variety of oscillators capable of performing these functions. In view of the known character of such oscillators a detailed description of oscillator RO will not be given herein. However, examples of suitable forms of construction for such oscillators can be found in U.S. Pat. No. 3,430,143 (FIG. 1, frequency generator 14) and in U.S. Pat. No. 3,080,452 (FIG. 1, oscillator G). Using bistable switching stages K1 through K4 the rectangular oscillator frequency is divided into the carrier frequency. The latter switching circuits may be conventional flip-flops or the like. The carrier frequency arises at the output of the switching stage K1 and is coupled to a transmission line U through a band limited filter and a device for frequency transformation (not shown).

The phase shifts are superimposed on the transmitted carrier frequency. A short pulse, which is added into the rectangular oscillation at any point in the frequency divider corresponds to a phase shift of 360°. A prerequisite is that the additional pulse does not coincide with an edge of the rectangular oscillation. The phase shift of 360° is reduced in each successive switching stage in the same relationship as the basic frequency. If, in FIG. 1, a pulse is added before the switching stage K1, there arises a 180° phase shift in the transmitted carrier frequency, since only the switching stage K1 follows. If the pulse is added before the switching stage K2, a 90° phase shift occurs, since two switching stages K1, K2 follow, and each switching stage halves the value which was fed in. If the pulse is added before the switching stage K3, a 45° phase shift occurs, whereas in adding a pulse before the switching stage K4 a 22.5° phase shift occurs.

Semi-adders HA1 to HA4 are connected between the bistable switching stages. The semi-adders permit the adding of the short pulses from the coder, with positive as well as with negative halves of the rectangular oscillation. In the FIG. 1 circuit Exclusive Or gates can be used advantageously for the semi-adder.

Gates G1 to G4 are included in modulator MO, and these emit a short pulse to the accompanying semi-adders for the duration of a timing cycle, St1–ST4, respectively, when the binary state "1" is coupled to the second gate input. The timing cycle or pulse is taken from the transmission oscillator RO over the divider stages of frequency divider FD, which is constructed in the conventional manner, and determines the modulation moments, in which the phase shifts are superimposed one after the other on the carrier oscillation. That is, each of the timing pulses S*t*1–4 are taken from individual ones of the divider stages of frequency divider FD. This frequency divider is not described in greater detail herein in view of the fact that it is contemplated that any of the variety of conventional frequency dividers available might be used to fulfill its function. Examples of suitable frequency dividers which might be used are to be found in U.S. Pat. No. 3,430,143 (FIG. 1, frequency divider 16), and in U.S. Pat. No. 3,080,452 (FIG. 1, frequency divider T1). A particular timing cycle is coupled over terminals S*t*1 to S*t*4, whereby the short pulses of each timing cycle on the four input lines are in time succession transferred so that as more phase values are fed in, which when added produce a phase shift, no mutual interference occurs.

At the moment of the timing cycle, the gates G1 to G4 are interrogated, and if a binary state "1" has been emitted from the coder, a positive pulse is transferred to the accompanying semi-adders. If, for example, the inputs *a*1' and *a*3' are in the binary state "1," at the time of the timing cycle pulse, the gates G1 and G3 feed a short pulse to the semi-adders HA1 and HA3. There arises in the carrier oscillation at the output of the switching stage K1 a phase shift $\tau_t$ of $\tau_t = 360°/2 + 360°/2^3 = 180° + 45° = 225° = -135°$ .

Coder CD emits binary step combination "1010" in the order *a*1', *a*2', *a*3', *a*4', and this step combination is associated with a phase shift $\tau_t = -135°$. The coder provides for the association of the message steps *a*1, *a*2, *a*3 and *a*4 to the binary values *a*1', *a*2', *a*3, and *a*4', which generate the desired phase shift in the modulator. The data to be transmitted are applied at an input E to a series-parallel converter SPU which links the data in groups of several steps. Two steps (dibits), three steps (tribits), or four steps (tetrabits) are combined respectively for a four-, eight- or sixteen-valued phase system into one phase shift. A bit cycle, which is coupled to terminal BT and is taken from the transmission oscillator RO over the switching stages in the serial to parallel converter SPU, scans or samples the message steps, preferably in the center, and feeds them into the switching stage K8. The bit cycle shifts the step which was fed in along by one switching stage with each cycle pulse. When four steps of the data to be transmitted have been fed into the switching stages K5 to K8, the timing cycle appears at the input lines St1 to St4, which interrogates the binary numerical values emitted at the coder outputs *a*1', *a*2', *a*3', *a*4'. Then, the coder could be eliminated. This solution, however, is not technologically optimal, because thereby gray code results. The coder in FIG. 1 forms a gray-code in which the binary step combinations for two neighboring phase shifts differ only by one bit. By far, the most frequent error resulting from strong interferences is that a phase shift value is falsified in the preceeding or in the following phase shift. Through use of the gray code, only one step is wrong in the received demodulated step combination.

Four steps of the message are coupled to the coder CD over the input terminals *a*1, *a*2, *a*3, and *a*4. The coder comprises semi-adders HA5, HA6 and HA7, which join the steps which were fed in such that the binary numerical value desired according to the gray code arises at the output lines *a*1', *a*2', *a*3', and *a*4'. In a phase system with eight phase jump values only the inputs $a1$, $a2$, and $a3$ and the outputs $a1'$, $a2'$ and $a3'$ of the coder are used. In a phase system with four phase shift values only the inputs $a1$ and $a2$ and the outputs $a1'$ and $a2'$ are used. The unused inputs or outputs of the coder are applied to a fixed potential.

FIG. 2$a$ demonstrates the relationship of the step combinations of the message to the phase shift values used, to which specific binary values correspond at the output of the coder. The left column contains the 16 different phase shift values which are used for the transmission of a message. The right hand column contains the 16 possible combinations of four combined steps of the message which are coupled to the input lines $a1$, $a2$, $a3$ and by one bit, so that if the associated phase shift in the adjoining phase shift is falsified in the step combination emitted at the receiving end, only one step is received incorrectly.

The middle column contains the output signal of the coder, which appears at the output lines $a1'$, $a2'$, $a3'$, and $a4'$ in the form of a binary number signal value. The binary values result from the associated phase shifts in that a binary "1" must appear at those outputs which are supposed to add a pulse to the rectangular oscillation over the interrogation gate effecting a phase shift. Should "1" states arise at several outputs simultaneously, pulses are added simultaneously over the associated gates, and the phase shift occurring in the carrier oscillation arises through summing of the individual phase shift values. The task of the coder is to associate the step combinations entered in the right hand column to the binary numerical values in the central column and to emit them at the outputs $a1'$, $a2'$, $a3'$, and $a4'$. This association is achieved in FIG. 1 with the semi-adders HA5, HA6 and HA7, which operate according to especially simple rules:

$a1' = a1$;
$a2' = a1 \ominus a2$;
$a3' = a1 \ominus a2 \oplus a3$;
$a4' = a1 \ominus a2\ a3 \oplus a4$;
$\oplus$denotes addition modulo 2.

FIG. 2$b$ illustrates the relationship of the binary step combinations (tribits) to the required binary numerical values at the output of the coder in a phase system with eight different phase shift values. In this arrangement the semi-adders HA4 and HA7, as well as the gate G4 in FIG. 1 are not used, so that the combining rule for $a4'$ is not used.

FIG. 2$c$ illustrates the relationship of the binary step combinations (dibits) to the required binary values at the output of the coder in a phase system with four different phase shift values $\tau_t$. The semi-adders HA7, HA6, HA4 and HA3, as well as the gates G4 and G3 in FIG. 1, are not used in a phase system with four phase shift values, so that the combination rules for $a4'$ and $a3'$ are not used.

Figures 3A, 3B, 4A:
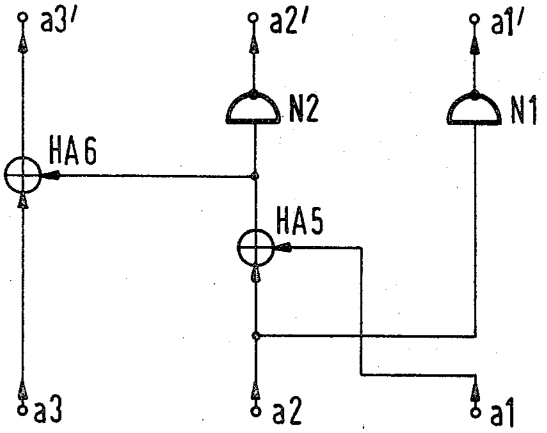
FIG. 3*a* is a chart showing an alternative relationship in the modulator and in the coder with eight phase shift values.
FIG. 3*b* is a schematic diagram of an alternative circuit arrangement of a coder operating according to FIG. 3*a;*
FIG. 4*a* is a chart showing the relationships of a compatible coder operating together with a known four-valued phase difference system.

FIG. 3$a$ shows an especially advantageous relationship of the step combinations (tribits) to the phase shift values in an eight valued phase difference system. This relationship proceeds from the requirement that the phase shift 0° be associated with a bit group (tribit) less likely than "000" or "111." Namely, in case the recovery of the cycle phase in the receiver rests on the phase shifts in the receiving signal, then the cycle recovery is interrupted just during such frequently appearing step sequences as continuous-"0"-state or continuous-"1"-state. In order to have the binary values in the middle column of the table in FIG. 3$a$ appear at the output of the coder, the following combining rules are to be follows:

$a1' = \overline{a2}$;
$a2' = \overline{a1 \oplus a2}$;
$a3' = a1 \oplus a2 \oplus a3$.

The circuit arrangement of a coder which fulfills these combining rules is shown in FIG. 3$b$. The coder in FIG. 1 was altered such that the relationship shown in FIG. 3$a$ results. The input lines $a1$, $a2$ and $a3$ lead to the semi-adders HA5 and HA6. The binary values at the output lines $a1'$ and $a2'$ are inverted over inverter stages N1 and N2. The output lines $a1'$, $a2'$ and $a3'$ lead to the associated interrogation gate.

The compatibility of the transmission circuit of this invention with already known four-valued phase systems, which use not $\tau_t$, but $\tau_e$ as information carrier, shall be demonstrated in the following. For this purpose it is necessary that the relationship between $\tau_e$ and $\tau_t$ be fully utilized. A modulation segment contains in general a whole number of carrier periods plus the mth part of a carrier period. The final phase of the modulation segment is then larger than the initial phase by $k = 360°/m$. If the next modulation segment is connected without phase shift, the difference between the initial phases, i.e., $\tau_e$ is: $\tau_e = \tau_k$. An additional phase shift $\tau_t$ then yields:

$$\tau_e = \tau_k + \tau_t'$$

The compatibility is produced when the coder forms those $\tau_t$, which result from the last named condition after insertion of the characteristic values $\tau_k'$ and $\tau_e'$ of the foreign system. Here one must consider that $\tau_t$ changes signs when, as assumed in the example at hand, after the modulation of the rectangular oscillation, a transfer of the signal spectrum to lower frequencies is undertaken. Then the compatibility condition reads:

$$\tau_t = \tau_k' - \tau_e'$$

In the following the flexibility of the coder is shown with the aid of different known phase systems. By switching a few connections in the coder, it may be adapted to variety of different system configurations.

In a known 4-valued phase system the duration of a carrier period amounts to 1/1800 sec., and the duration of a modulation segment is 1/1200 sec. This yields the result $\tau_k' = 180°$. The coding requirements are set forth in FIG. 4$a$. Two variations V1 and V2 are provided for in relating the step pairs (dibits) to the phase differences. These two variations differ in that variation V2 associates a phase difference different from 0° to the continuous state "00" or "11." The rules of combination for variation V1 are:

$$a1' = \overline{a2};$$
$$a2' = \overline{a1 \oplus a2};$$

The rules of combination for variation V2 are:

$$a1' = \overline{a1};$$
$$\overline{a2' = a1 \oplus a2}.$$

FIG. 4$b$ shows an exemplary construction of a compatible coder according to the invention. The coder contains a semi-adder HA5 and the inverter stages N1 and N2. The output line $a3'$ is permanently associated to either the continuous state "0" or the continuous state "1." In order to realize the system variation V1 of the known four-phases system, the connections 2, 3, and 5 must be inserted. The connections 1, 4 and 6 remain opened, so that the accompanying lines are interrupted. In system variation V2 the connections 1 and 5 are inserted, and connections 2, 3, 4 and 6 remain open.

In another known four-phase system the carrier period hasa duration of 1/1800 sec, and the duration of a modulation segment is 1/1200 sec. This yields the result that 1.5 carrier periods fall in the modulation segment; $\tau_k' = 180°$.

Figures 4B, 4C:
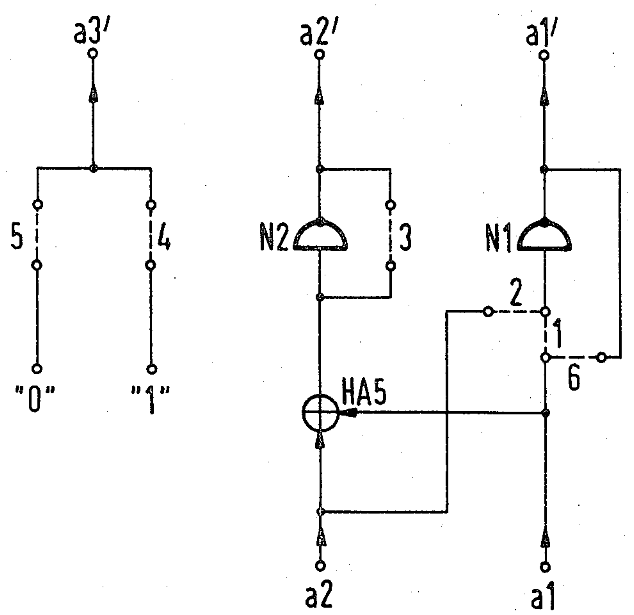
FIG. 4*b* is a schematic diagram of a second alternative circuit of the compatible coder to FIG. 4*a* and FIG. 4*c*.
FIG. 4*c* is a chart showing the relationships of the compatible coder operating together with another known four-valued phase difference system.

FIG. 4*c* shows the required coding relationships for the latter example, and accompanying directions for coding. The rules of combination are:

$$a1' = a1;$$
$$a2' = \overline{a1 + a2};$$
$$a3' = 1.$$

To realize these coding requirements, the connections 4 and 6 are inserted in the coder in FIG. 4*b*, whereas the connections 1, 2, 3 and 5 remain open.

The coder is also in a simple manner compatible with other phase systems which have a larger number of phase shifts.

To better illustrate the operations of the FIG. 1 circuit arrangement, it will be further described hereinbelow using the coding described in FIG. 2*a* in conjunction with FIGS. 5 and 6.

Figures 5, 6:
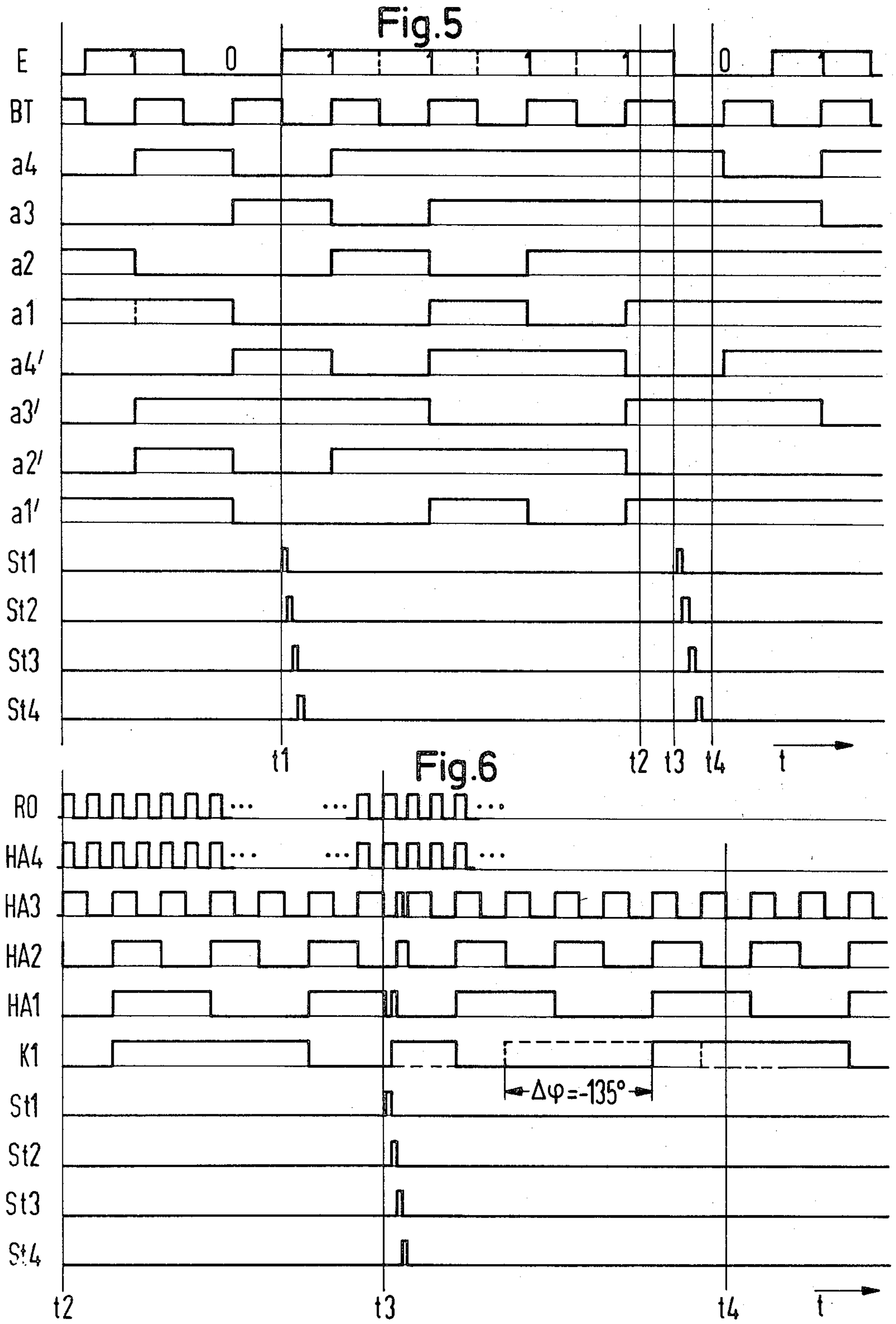
FIGS. 5 and 6 are waveform diagrams illustrating the waveforms appearing at the indicated points in the FIG. 1 embodiment, as well as the time relationships between them.

In FIG. 5, it is assumed that the instants t1 and t3 indicate the limits of the modulation periods of the phase-difference-modulated signals at the output U of the modulator MO. At these instants, phase changes of the phase-difference-modulated signals may occur. For example, at the instant t3, a phase change shall occur which is assigned to a binary data signal 1 1 1 1.

The binary data signals are applied to the input E of the series-parallel converter SPU. In connection with FIG. 5, any sequence of binary data signals can be used which also contains the binary signals 1 1 1 1. Rectangualr signals are generated from the rectangular signals at an output of the oscillator RO by means of a simple frequency divider having a frequency so great that exactly four rectangular signals occur during a modulation interval. The rectangular signals are routed as bit pulses to the clock input BT of the series-parallel converter SPU. With each leading edge of the rectangular signals at the clock input BT the binary signals applied to the data inputs of the flip-flop circuits K8 to K5 are placed into storage therein. The signals *a4* to *a*1 at the outputs of the flip-flop circuits K8 to K5 are also shown in FIG. 5. As apparent from the drawing, at the instant *t3* the binary signals 1 are placed into storage in all flip-flop circuits K8 to K5.

The signals *a*4 to *a*1 are routed to the inputs of a coder CD. The coder CD transmits, at its output, the signals *a4'* to *a1'*, the binaries of which are generated as a function of the binaries of the signals *a4* to *a1* in accordance with the table shown in FIG. 2*a*. The signals *a4'* to *a1'* are also illustrated in FIG. 5. They have the binary values 0 1 0 1 at the instant *t*3.

At the instants *t*1 and *t*3, that is, at the limits of the modulation intervals, the pulses ST4 to ST1 are generated. They are, likewise, produced from rectangular signals at an output of the oscillator RO by means of the frequency divider FD. In the interest of clarity, in FIG. 5 the pulses are shown wider than they actuallly are. Moreover, their mutual displacement is shown in an exaggerated manner. The pulses ST4 to ST1, for example, are obtained after four bit pulses at the input BT of the series-parallel converter SPU from four consecutive rectangular signals at the input of the frequency divider FD.

In FIG. 6, the area between the instants *t*2 and *t*4 of FIG. 5 is shown in a larger time slot pattern. It shows rectangular signals which are transmitted at an output of the oscillator RO and routed to the modulator MO. The modulator MO comprises four flip-flop circuits K4 to K1 which divide the repetition rate of the rectangular signals by the factor 2 between the instants *t*4 and *t*3, as shown in FIG. 6.

At the instant *t*3, the pulses S*t*4 to S*t*1 appear. Since the signals *a*4' to *a*1' are applied to the gates G4 to G1 and the signals *a*3' and *a*1' have the value binary 1, only the pulses S*t*3 or S*t*1 are allowed to pass through the gates G3 to G1 and are routed to the half adders HA3 to HA1.

The pulses ST3 to ST1 are superimposed on the signals at the outputs of the flip-flop circuits K4 or K2 over the half adders HA3 or HA1, and they switch in addition, as also shown in FIG. 6, all of the subsequent flip-flop circuits to the opposite direction.

Since each pulse at the output of the next flip-flop circuit causes a phase change of 180° and the pulses have been faded in at the inputs of the flip-flop circuits K3 to K1, a phase change $\Delta\phi$ of 45°+180°=225°=−135° is produced at the output of the flip-flop circuit K1. In FIG. 6, the pulses S*t*4 to S*t*1 are so illustrated that they all appear during a period of the rectangular signals at the output of the oscillator RO. However, they can also be distributed over several periods. Precautions must be taken against interference with edges of rectangular signals at the outputs of the flip-flop circuits K4 to K1.

Furthermore, to clarify the phase change $\Delta\phi$ that has occurred, a dashed line is shown in FIG. 6 to indicate what course the rectangular signal at the output of the flip-flop circuit K1 would take if no phase change had occurred at the instant *t*3.

The rectangular signals at the output of the flip-flop circuit K1 represent, at the same time, the phase-difference-modulated signals at the output Ü of the modulator MO.

The embodiments described hereinabove are only exemplary of the principles of the invention and are not to be considered as limiting. It is contemplated that a number of modifications and changes may be made to the described embodiments within the scope of the claimed invention. In particular, numerous other coding variations may be used, and the transmission circuit can be altered accordingly.

I claim:

1. Apparatus for transmitting binary data by phase difference modulating a carrier frequency wherein each data level is represented by a specific, different phase shift value, the various modulating phase shifts being transmitted in succession within the time interval of a predetermined modulation segment, comprising:

oscillator means for producing a periodic signal of waveform and having a frequency equal to N times the carrier frequency, where N equals the number of different phase shift values to be transmitted, frequency divider means connected to the output of said oscillator for reducing the oscillator output frequency to said carrier frequency, said divider comprising a series of bistable switching stages, coding means, including means for receiving the binary data signals to be transmitted, for combining the data levels falling within a given modulation segment and for determining the phase shift value corresponding with said combination, said coding means having a separate output line for each said phase shift value, control input means on each said bistable switching stage, each said output line being connected to the control input means of the bistable switching stage capable of effecting the phase shift on that output line, and means for causing a pulse to be emitted on one of said output lines at the beginning of a modulation segment, said pulse effecting a 360° phase shift, said phase shift being halved in each of the subsequent bistable switching stages.

2. The apparatus defined in claim 1 wherein said means for causing a pulse to be emitted comprises:

semi-adder means interposed between said bistable switching stages and between said oscillator and the first of said series of bistable switching stages, the outputs of said semi-adders being connected, respectively, to the control input means of the succeeding bistable switching stage, one input of each said semi-adder being connected to the output of the preceeding bistable switching stage, the one input of said semi-adder connected between said oscillator and said first bistable switching stage being connected to the oscillator output, said apparatus further comprising:

individual gate means connecting said output lines of said coding means to said control input means through other inputs of said semi-adder means and timing means for producing timing pulses at predetermined intervals, said timing means being connected to an input of each said gate means, at that each said gate means is opened to pass the signal on the output line associated therewith upon the appearance of a timing pulse at its said input.

3. The apparatus defined in claim 2 wherein said receiving means includes series to parallel converter means for receiving serially transmitted data and for coupling said data to said coding means in parallel form.

4. The apparatus defined in claim 3 wherein said coder comprises a plurlaity of semi-adder means, one input of each semi-adder means being connected to an output of said series to parallel converter means, the other inputs being connected to outputs of different semi-adders in said plurality, the outputs of said plurality of semi-adders being connected to said coding means output lines.

5. The apparatus defined in claim 4 wherein said semi-adders are exclusive OR gates.

* * * * *